April 11, 1961 TADASHI YAMADA ET AL 2,979,044
SWIRL COMBUSTION CHAMBER FOR DIESEL ENGINES
Filed July 6, 1959
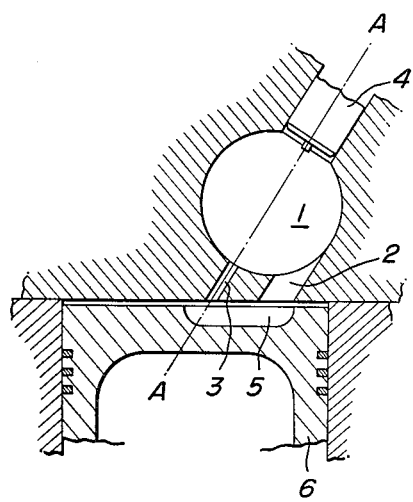
TADASHI YAMADA
MOTOHIKO UNO
INVENTORS

2,979,044
SWIRL COMBUSTION CHAMBER FOR DIESEL ENGINES

Tadashi Yamada, Higashisumiyoshi-ku, Osaka, and Motohiko Uno, Nishinomiya-shi, Japan, assignors to Yasuhito Yamaoka, Sakyo-ku, Kyoto, Japan Filed July 6, 1959, Ser. No. 825,170

Claims priority, application Japan Jan. 28, 1959

2 Claims. (Cl. 123—32)

The present invention relates to an improvement of diesel engines, and particularly of the swirl combustion chamber in diesel engines.

The swirl combustion chamber is ordinarily used in smaller diesel engines having cylinders about 100 mm. or less in diameter. With previous smaller diesel engines having cylinders of such small diameters, the starting characteristic obtained tends to be unsatisfactory. It has been known to those engaged in the art that improvements in the power output characteristics, that is, reduction of fuel consumption and/or increase of maximum power output result in prejudicing the starting characteristic of the engine, while improvement in the starting characteristic tends to cause detraction from the power characteristic. Thus, it has been difficult with smaller diesel engines to obtain a combustion chamber providing for combined desirable starting and power characteristics.

The object of the present invention is to provide a swirl combustion chamber in diesel engine which is effective to improve both the starting and power characteristics of the diesel engine.

According to the present invention, there is provided a swirl combustion chamber in a diesel engine comprising a substantially spherical swirl chamber provided in the cylinder head and having a fuel injection nozzle opening therein, a main passage interconnecting the swirl chamber and a main combustion chamber within the engine cylinder above the piston therein, and an auxiliary passage also interconnecting the vortex and main combustion chambers.

The accompanying drawing shows a fragmentary cross sectional view of a part of a diesel engine incorporating the swirl combustion chamber, the section being taken in a plane including the respective axes of the fuel injection nozzle and the associated cylinder.

In the drawing, reference numeral 1 designates a substantially spherical swirl chamber provided in the cylinder head 2 of the diesel engine. Reference numeral 3 designates a main passage interconnecting the swirl chamber 1 and the main combustion chamber 4. Numeral 4 designates a fuel injection nozzle opening in the swirl chamber 1. Reference numeral 6 is a piston in the cylinder having a recess 4 formed in the top of the piston which constitutes the major part of the main combustion chamber 4 as defined when the piston 6 is in the upper end of the compression stroke of the piston as illustrated in the drawing. According to the present invention, an auxiliary passage 7 is formed in the cylinder head 2 so as to interconnect the swirl chamber 1 and the main combustion chamber 4. The auxiliary passage 7 is made smaller in diameter than the main passage 3. It will be seen in the drawing that the auxiliary passage is substantially in alignment with the longitudinal axis of the nozzle 5, as indicated by the line A—A in the drawing. However, it is not necessary that the auxiliary passage be aligned with the fuel injection nozzle, though it is desirable that the auxiliary passage is directed toward the end of the nozzle.

Experiments conducted by the inventors on a single-cylinder engine provided with a swirl combustion chamber of the present invention having an auxiliary passage of 2 mm. diameter aligned with the fuel injection nozzle as illustrated in the drawing, and on a conventional diesel engine of the same general design and provided with no auxiliary passage, show that the diesel engine of the instant invention presents a remarkably improved starting characteristic, without impairing the power characteristics, as will be described below. Both inventive and conventional engines are of 4-stroke type and have cylinder diameter of 65 mm. and a piston stroke of 72 mm. The maximum power output obtained with either of engines is 4.75 H.P. at 2600 r.p.m., and their minimum specific fuel consumptions at 2600 r.p.m. are substantially equal to each other, that is, 213 gr./H.P.-hr. for the engine of the present invention and 210 gr./H.P.-hr. for the conventional engine. However, the starting characteristics of these engines are greatly different, that is, the lowest permissible atmospheric temperature for starting the engine of the present invention is between 5° C. to 6° C., while that for the conventional engine is from 12° C. to 15° C. When an amount of gasoline is added to suction air for the purpose of expediting starting of the engine, the lowest permissible atmospheric temperature is lowered to between 0° C. and —2° C. for the former engine, and to 3°–6° C. for the latter engine.

It is not quite clear why the starting characteristic is improved by the provision of an auxiliary passage according to the present invention. But, it is probable that a part of the fuel spray with the inventive engine proceeds more smoothly through the auxiliary passage 7 into the main combustion chamber 4 and thus be more readily ignited by the high temperature of compressed air therein, than in case of conventional engines, and that with the inventive engine, its power characteristic is maintained as high as those of conventional engines due to the fact that at the beginning of expansion stroke of the engine, the imperfectly combusted gas from the swirl chamber is allowed to rush into the main combustion chamber through both main and auxiliary passages and thus the fuel combustion in the main combustion chamber is substantially expedited thereby to improve the power characteristic of the engine.

What we claim is:

1. A swirl chamber type diesel engine, comprising a cylinder head having a substantially spherical swirl chamber therein and a fuel injection nozzle opening into the swirl chamber, an engine cylinder on which said cylinder head is mounted and a piston in said cylinder with a main combustion chamber within the engine cylinder above the piston, said cylinder head having a main passage interconnecting the swirl chamber and the main combustion chamber, said cylinder head further having an auxiliary passage therein extending directly from the swirl chamber to the main combustion chamber and disposed in substantial alignment with the fuel injection nozzle and having a diameter smaller than that of said main passage.

2. A swirl chamber type diesel engine, comprising a cylinder head having a substantially spherical swirl chamber therein and a fuel injection nozzle opening into said swirl chamber centrally thereof, an engine cylinder on which said cylinder head is mounted and a piston in said cylinder with the main combustion chamber within the engine cylinder above the piston, said cylinder head having a main passage extending from the periphery of said swirl chamber and in a tangential direction therefrom to said main combustion chamber, said cylinder head further having an auxiliary passage therein extending directly from the swirl chamber to the main combustion chamber, said auxiliary passage having the longitudinal axis thereof disposed in substantial alignment with said fuel injection nozzle and having a diameter smaller than that of said main passage.

References Cited in the file of this patent

UNITED STATES PATENTS

| | | |
|---|---|---|
| 746,840 | Hurd | Dec. 15, 1903 |
| 2,316,794 | Johnson | Apr. 20, 1943 |

FOREIGN PATENTS

| | | |
|---|---|---|
| 372,520 | Italy | June 30, 1939 |
| 163,554 | Austria | July 25, 1949 |

OTHER REFERENCES

Klockner: German application 1,031,574, printed June 4, 1958 (K1 46$a^2$ 79/02).

Klockner: German application 1,045,159, printed Nov. 27, 1958 (K1 46$a^2$ 79/02).